United States Patent
Kassimis et al.

(10) Patent No.: US 10,382,490 B2
(45) Date of Patent: Aug. 13, 2019

(54) ENFORCING A CENTRALIZED, CRYPTOGRAPHIC NETWORK POLICY FOR VARIOUS TRAFFIC AT A HOST

(71) Applicant: INTERNATIONAL BUSINESS MACHINES CORPORATION, Armonk, NY (US)

(72) Inventors: Constantinos Kassimis, Cary, NC (US); Christopher Meyer, Cary, NC (US); Linwood H. Overby, Jr., Raleigh, NC (US); David J. Wierbowski, Owego, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

(21) Appl. No.: 15/413,577

(22) Filed: Jan. 24, 2017

(65) Prior Publication Data
US 2018/0212999 A1    Jul. 26, 2018

(51) Int. Cl.
*G06F 21/00*    (2013.01)
*H04L 29/06*    (2006.01)
*H04L 29/08*    (2006.01)

(52) U.S. Cl.
CPC ............ *H04L 63/20* (2013.01); *H04L 67/14* (2013.01); *H04L 67/22* (2013.01); *H04L 67/2833* (2013.01); *H04L 67/42* (2013.01); *H04L 69/16* (2013.01); *H04L 63/166* (2013.01)

(58) Field of Classification Search
None
See application file for complete search history.

(56) References Cited

U.S. PATENT DOCUMENTS

| 7,797,752 B1 | 9/2010 | Vaidya et al. |
| 8,141,126 B2 | 3/2012 | Gearhart et al. |
| 8,214,875 B2 | 7/2012 | John et al. |
| 8,539,548 B1 | 9/2013 | Overby, Jr. et al. |

(Continued)

OTHER PUBLICATIONS

Anonymously, "A method of routing based on security protocols", ip.com, IPCOM000227448D May 8, 2013, pp. 1-5.

(Continued)

*Primary Examiner* — Maung T Lwin
(74) *Attorney, Agent, or Firm* — Cantor Colburn LLP; William Kinnaman (57) ABSTRACT

A computer-implemented method includes monitoring a plurality of connections of a plurality of host applications at a host, where each connection of the plurality of connections carries network traffic associated with a respective host application of the plurality of host applications. A plurality of sets of security attributes are detected, and include a respective set of security attributes for each connection of the plurality of connections. The plurality of sets of security attributes are stored in a security database. From the security database, the respective set of security attributes of a first connection are compared to a centralized security policy. It is determined that the respective set of security attributes of the first connection do not meet the centralized security policy. A remedial action is performed on the first connection, responsive to the respective set of security attributes of the first connection not meeting the centralized security policy.

20 Claims, 3 Drawing Sheets

(56) References Cited

U.S. PATENT DOCUMENTS

| | | | | |
|---|---|---|---|---|
| 8,595,820 B1* | 11/2013 | Vaidya | ............... | H04L 12/4641 |
| | | | | 713/151 |
| 8,621,549 B2* | 12/2013 | Lim | ..................... | G06Q 10/10 |
| | | | | 726/1 |
| 2003/0131245 A1* | 7/2003 | Linderman | ......... | H04L 63/0218 |
| | | | | 713/176 |
| 2007/0266422 A1* | 11/2007 | Germano | ............ | H04L 63/0263 |
| | | | | 726/1 |
| 2010/0306374 A1* | 12/2010 | Yacoby | .............. | H04L 41/0893 |
| | | | | 709/224 |
| 2010/0333168 A1* | 12/2010 | Herrod | ............... | H04L 41/0813 |
| | | | | 726/1 |
| 2014/0189777 A1* | 7/2014 | Viswanathan | ........ | H04L 63/105 |
| | | | | 726/1 |
| 2014/0230012 A1* | 8/2014 | Ahn | ....................... | G06F 21/53 |
| | | | | 726/1 |
| 2016/0323323 A1* | 11/2016 | Yanovsky | .............. | H04L 63/20 |

OTHER PUBLICATIONS

IBM et. al., "Network Communication Validation by Automated Policy Examination", ip.com, IPCOM000019247D, Sep. 8, 2003, pp. 1-7.

* cited by examiner

ENFORCING A CENTRALIZED, CRYPTOGRAPHIC NETWORK POLICY FOR VARIOUS TRAFFIC AT A HOST

BACKGROUND

Embodiments of the present invention relate to network traffic and, more specifically, to enforcing a centralized, cryptographic network policy for various traffic at a host.

For an Internet Protocol (IP)-based application, such as a web-based application, network security can be built into the application itself or into the Transmission Control Protocol/Internet Protocol (TCP/IP) stack used by the application. For example, application-based security protocols include Transport Layer Security (TLS) and Secure Shell (SSH). An example of a TCP/IP stack security protocol is Internet Protocol Security (IPsec).

In a system running multiple applications, more than one of these network security protocols can be in use for running applications at a given time. In some cases, more than a single network security protocol can even be used for a single TCP/IP connection.

SUMMARY

According to an embodiment of this disclosure, a computer-implemented method includes monitoring a plurality of connections of a plurality of host applications at a host, where each connection of the plurality of connections carries network traffic associated with a respective host application of the plurality of host applications. A plurality of sets of security attributes are detected, and include a respective set of security attributes for each connection of the plurality of connections. The plurality of sets of security attributes are stored in a security database. From the security database, the respective set of security attributes of a first connection are compared to a centralized security policy. It is determined that the respective set of security attributes of the first connection do not meet one or more requirements of the centralized security policy. A remedial action is performed, by a computer processor, on the first connection carrying the network traffic, responsive to the respective set of security attributes of the first connection not meeting the one or more requirements of the centralized security policy.

In another embodiment, a system includes a memory having computer-readable instructions and one or more processors for executing the computer-readable instructions. The computer-readable instructions include monitoring a plurality of connections of a plurality of host applications at a host, where each connection of the plurality of connections carries network traffic associated with a respective host application of the plurality of host applications. Further according to the computer-readable instructions, a plurality of sets of security attributes are detected, and include a respective set of security attributes for each connection of the plurality of connections. The plurality of sets of security attributes are stored in a security database. From the security database, the respective set of security attributes of a first connection are compared to a centralized security policy. It is determined that the respective set of security attributes of the first connection do not meet one or more requirements of the centralized security policy. A remedial action is performed on the first connection carrying the network traffic, responsive to the respective set of security attributes of the first connection not meeting the one or more requirements of the centralized security policy.

In yet another embodiment, a computer-program product for enforcing a centralized, cryptographic network policy includes a computer-readable storage medium having program instructions embodied therewith. The program instructions are executable by a processor to cause the processor to perform a method. The method includes monitoring a plurality of connections of a plurality of host applications at a host, where each connection of the plurality of connections carries network traffic associated with a respective host application of the plurality of host applications. Further according to the method, a plurality of sets of security attributes are detected, and include a respective set of security attributes for each connection of the plurality of connections. The plurality of sets of security attributes are stored in a security database. From the security database, the respective set of security attributes of a first connection are compared to a centralized security policy. It is determined that the respective set of security attributes of the first connection do not meet one or more requirements of the centralized security policy. A remedial action is performed on the first connection carrying the network traffic, responsive to the respective set of security attributes of the first connection not meeting the one or more requirements of the centralized security policy.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

As enterprises move more to an "encrypt everywhere" paradigm, these enterprises may be required to ensure that data traffic across various applications of a host is encrypted according to an enterprise security policy. Cryptographic protection of IP traffic can be applied in various ways, using various cryptographic protocols. TLS, Secure Sockets Layer (SSL), and SSH can be applied on a per-Transmission Control Protocol (TCP) connection basis. TLS and SSL configurations can be controlled through either application-specific controls or TCP/IP stack controls. An SSH configuration is typically managed in dedicated SSH configuration files. Unlike TLS, SSL and SSH, a single IPsec security session, or tunnel, can protect not only multiple connections, but multiple connections from different applications and even different IP protocols, such as TCP, User Datagram Protocol (UDP), and Internet Control Message Protocol (ICMP). Other cryptographic security protocols may also be available to protect other types of IP traffic. The existence of so many cryptographic protocols and so many configuration mechanisms means that multiple personnel, many with varying responsibilities, are often involved in configuring these different mechanisms. As a result, it is difficult for a security administrator to determine whether all their applications and associated network traffic are properly secured.

Conventionally, there is no mechanism to determine any of the following: which data traffic is cryptographically protected and which is not, by which cryptographic protocol and protocol version traffic is protected, details of specific security attributes (e.g., cryptographic algorithms, key sizes, etc.) used for a given secure session, which cryptographic protection meets enterprise-level security policy requirements, and which specific application connections are protected by an IPsec tunnel.

Turning now to an overview of aspects of the present invention, some embodiments of a security system described herein provide a mechanism for externalizing network security usage information for application traffic across a potentially diverse set of network security protocols by tracking network security protocol usage down to a connection basis. To this end, in some embodiments, the security system may add capabilities to a TCP/IP stack as a common collection point for network security usage information.

Conventionally, a TCP/IP stack has direct visibility only to network security protocols implemented within that stack. For network security implemented in the application, such as TLS and SSH, the security system may use a novel communication method between security components and the TCP/IP stack so that the TCP/IP stack can become aware of security session attributes for each application connection. For IPsec, which is implemented in the TCP/IP stack and may have security sessions that are not associated with specific application connections, the security system may maintain a record of IPsec security session usage information at the connection level. In some embodiments, the security system allows attributes for multiple security sessions and across diverse network security protocols to be associated concurrently with a single application connection. Further, in some embodiments, the security system uses a centralized network security policy across the diverse network security protocols so that a centralized network security policy can be enforced in the TCP/IP stack. These capabilities will be described further below.

Figure 1:
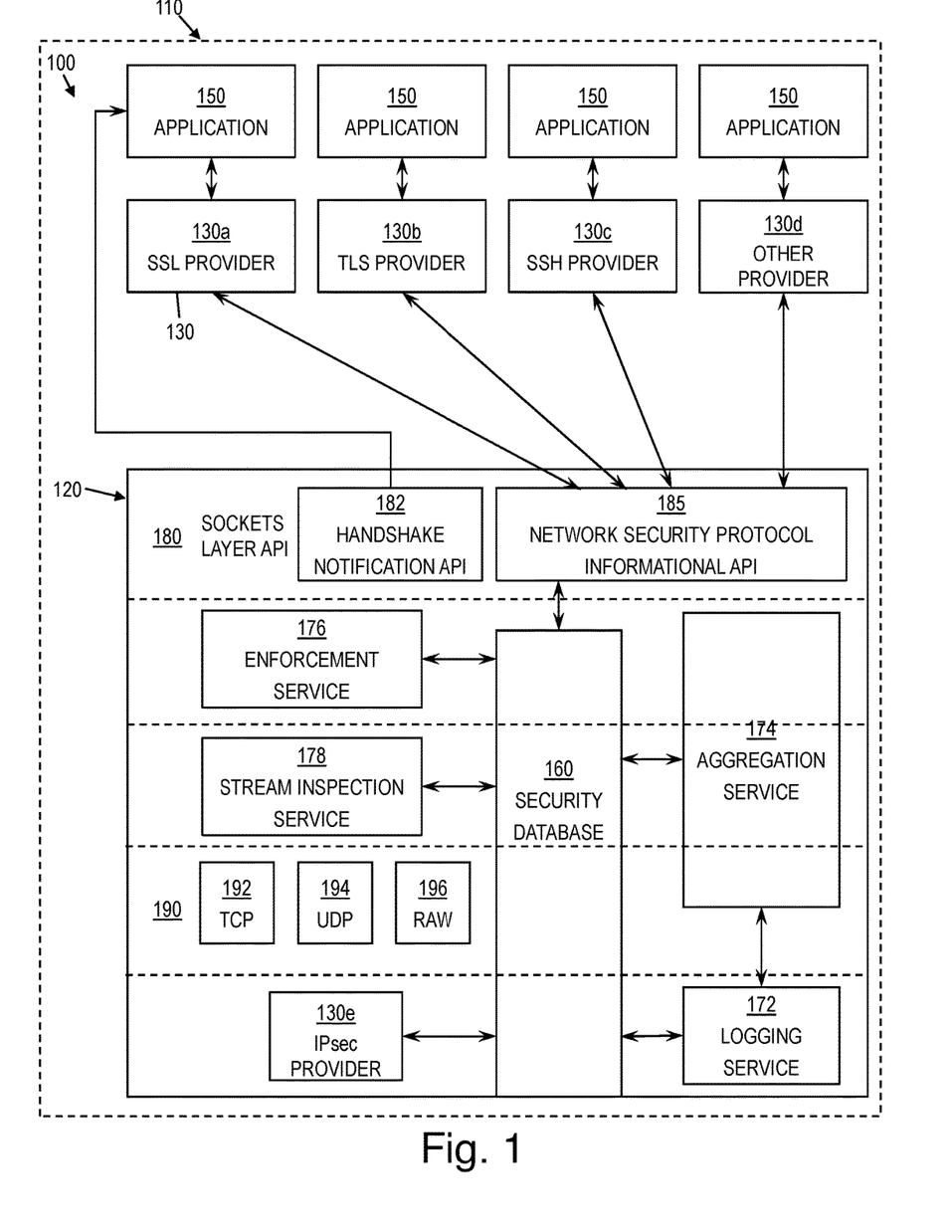
FIG. 1 is a block diagram of a security system, according to some embodiments of this invention.

FIG. 1 is a diagram of a security system 100, according to some embodiments of this disclosure. The security system 100 may be incorporated into a host 110, or local host 110, and may monitor traffic to and from the host 110 to determine whether adequate security is applied to that traffic.

Some aspects of the security system 100 may be integrated into the TCP/IP stack 120. The security system 100 may utilize code that implements TCP, UDP, and IPsec protocols as a centralized repository of security attributes (e.g., cryptographic protection attributes, such as cryptographic algorithms, key sizes, etc.) for network traffic. In this disclosure, the code that implements the TCP 192, UDP 194, and IPsec protocols is collectively referred to as the TCP/IP stack 120. The TCP/IP stack may further implement RAW 196, or raw sockets, which can allow other IP protocols to be defined and used. Generally, IPsec is a lower-level network security protocol that can be used to secure any IP-based traffic, including higher level transport protocols such as TCP 192 and UDP 194.

As shown in FIG. 1, traffic at the host 110 (i.e., to or from the host 110) may be implemented by one or more security protocols provided by one or more security protocol providers 130. These security protocol providers may include, for example, a SSL provider 130a, a TLS provider 130b, an SSH provider 130c, and another provider 130d. Further, although only one of each security protocol provider 130 is shown in FIG. 1, it will be understood that there may be multiple security protocol providers 130 for a given security protocol. In some embodiments, the SSL provider 130a, the TLS provider 130b, and the SSH provider 130c are security protocol providers 130 that are external to the TCP/IP stack (i.e., implemented outside the TCP/IP stack), while the IPsec provider 130e is internal to the TCP/IP stack (i.e., implemented within the stack). In some embodiments, the security protocol providers 130 may create network security attributes describing security applicable to monitored traffic, as will be described below. Each security protocol provider 130 may be in communication with the TCP/IP stack and, specifically, with a network security protocol informational API 185 of the TCP/IP stack 120.

A respective application 150, such as middleware, may be in communication with each security protocol provider 130. However, in some embodiments, although not shown in FIG. 1, a given application 150 may be communicate with more than a single security protocol provider 130. Each application 150 may perform IP-based network communication to enable the use of services and Application Programming Interfaces (APIs) provided by its one or more associated security protocol providers 130 to secure the communications of those security protocol providers 130.

As further shown in FIG. 1, the security system 100 may include at least one security database 160 in the TCP/IP stack 120. The security database 160 may maintain security attributes of network traffic, as determined by the security system 100. In some embodiments, the security database 160 may be stored in a persistent storage medium.

The security system 100 may further include, in the TCP/IP stack 120, a logging service 172, an aggregation service 174, an enforcement service 176, and a stream inspection service 178. Generally, the security database 160 may maintain security attributes identified in traffic at the host 110, the logging service 172 may log security attributes using the security database 160 as input, the aggregation service 174 may organize the stored security attributes as will be described below, and the enforcement service 176 may ensure that a centralized security policy is enforced for all applicable traffic at the host 110.

In some embodiments, the security system 100 may perform four general functions: discovery, aggregation, enforcement, and reporting.

Discovery performed by the security system 100 may include the discovery of which security protocols are being used to protect each application connection established through the TCP/IP stack, and may also include discovery of which specific security attributes are being used for each such application connection. This discovery may be performed by various mechanisms, for example, by the stream inspection service 178 or by the network security protocol informational API 185, or by a combination of both these mechanisms.

In some embodiments, the TCP/IP stack 120 may inspect incoming and outgoing byte streams to the host 110 to determine which traffic is protected and by which mechanisms. In some embodiments, this may be performed by the stream inspection service 178 of the TCP/IP stack 120. Specifically, the TCP/IP stack 120 may inspect byte streams between its sockets API layer 180 and a transport protocol layer 190. The transport protocol layer 190 may include code for implementing TCP 192, UDP 194, or other protocols allowed by RAW 196. In some embodiments, for TCP 192, the byte stream needs to be inspected only when bytes are determined to be in stream order, thus ignoring data packets that are duplicated, retransmitted, or otherwise out of order.

In some embodiments, determining whether traffic associated with a connection is protected may involve examining the sequence of bytes transmitted across the connection. This examination may begin with the first byte of data transmitted across the connection, establishing that the connection exists. Generally, a handshake indicating a security protocol is expected to occur early in the byte stream. Thus, if no handshake is detected after a threshold number of bytes have been transmitted across the connection, the stream inspection service 178 may stop monitoring the connection and may assume that no security protocol is being used for the connection. However, in some embodiments, an application 150 associated with the connection may send a signal through the sockets layer API 180 to notify the security system 100 that a handshake is about to occur over the connection, and in that case, the security system 100 may resume examining traffic transmitted over the connection.

If a security protocol is detected upon inspecting this traffic, then the security system 100 may create an entry in the security database 160 corresponding to the connection over which the traffic is being transmitted. Relevant security attributes may be recorded in the database entry. This set of security attributes associated with an instance of a protection scheme under a single cryptographic security protocol is hereinafter referred to as secure session information, and defines a secure session. In some embodiments, one or more secure sessions, or no secure sessions, may apply to a given connection at a given time. In the case of UDP 194, as will be described later, the entry in the security database 160 may be created for a pseudo-connection rather than a traditional connection established through TCP 192.

The security protocol providers 130 may provide standard network security protocol functions (e.g., TLS, SSL, or SSH) to the applications 150. Additionally, in some embodiments, when a security protocol provider 130 is invoked to perform network security protocol processing, that security protocol provider 130 may invoke the network security protocol informational API 185, so as to report applicable security attributes to the TCP/IP stack. Those security attributes may then be stored in the security database 160 in association with the connection over which the security is to be used.

The network security protocol informational API 185 may be implemented in the sockets API layer 180 of the TCP/IP stack 120. The network security protocol informational API 185 may allow the security protocol providers 130 to inform the TCP/IP stack 120 of network security attributes for a connection. Specifically, the network security protocol informational API may allow the network security protocol providers 130 to report the beginning of a security session, the change in security state or the termination of a security session, which are activities that are not conventionally observable. As is the case during stream inspection, security attributes determined may be stored in the security database 160. Further, in the case that such security attributes contradict those already determined and stored in the security database 160 by way of stream inspection, one mechanism of determining security attributes may be prioritized over another for the purpose of determining which security attributes to keep. For example, and not by way of limitation, the security attributes determined through the network security protocol informational API 185 may be given higher priority. In that case, security attributes determined from stream inspection may be deleted from the security database 160 if deemed to conflict with security attributes determined by the network security protocol informational API 185. It will be understood, however, that the reverse priority may be used instead.

While both of these techniques (i.e., by way of stream inspection and by way of the network security protocol informational API 185) may be used by the security system 100, in some embodiments, the network security protocol informational API 185 may be able to determine information not accessible through stream inspection only. Specifically, for instance, the below table, which is applicable to SSL and TLS versions up to TLSv1.2, illustrates which TLS security attributes are observable depending on the technique used.

| Security Attribute | Available via stream inspection on initial handshake? | Available via stream inspection on session refresh, or re-handshake (RHS)? | Available via stream inspection on session resume? | Available only via network security protocol informational API |
|---|---|---|---|---|
| Security protocol | Yes | No | Yes | N/A |
| Protocol version | Yes | No | Yes | Yes for RHS |
| Symmetric session key algorithm (encryption) | Yes | No | Yes | Yes for RHS |
| Symmetric session key algorithm (data integrity) | Yes | No | Yes | Yes for RHS |
| Public/private key generation method | Yes | No | Yes | Yes for RHS |
| Public/private key length (server and client certificates) | Yes, from certificate payloads | No | N/A | Yes for RHS |

-continued

| Security Attribute | Available via stream inspection on initial handshake? | Available via stream inspection on session refresh, or re-handshake (RHS)? | Available via stream inspection on session resume? | Available only via network security protocol informational API |
|---|---|---|---|---|
| Endpoint authentication method (e.g., server authentication, mutual authentication) | Yes | No | N/A | Yes for RHS |
| Signing Certificate Authority name (server and client certificates) | Yes | No | N/A | Yes for RHS |
| Server name | Yes | No | N/A | Yes for RHS |
| Client name | Yes | No | N/A | Yes for RHS |
| Certificate revocation policy | No | No | N/A | Yes |
| Affirmation that TLS session handshake completed | No | No | No | Yes for RHS |
| Recognition that TLS session failed prior to completed handshake | Yes | No | Yes | Yes for RHS |
| Recognition that TLS session ended | No | No | No | Yes |

As mentioned above, one or more of the security protocol providers 130 may report security attributes to the TCP/IP stack 120 by way of the network security protocol informational API 185. However, in some embodiments, the IPsec provider 130e may reside inside the TCP/IP stack 120 itself and may thus be given special considerations.

IPsec can be used to protect various types of traffic that pass thru the TCP/IP stack 120. Generally, there may be three types of traffic through the TCP/IP stack 120: TCP 192, UDP 194, and other protocols accessed through RAW 196. Some embodiments of the security system 100 focus on monitoring and analysis of TCP traffic and UDP traffic, as discussed herein, but can be extended to address IP protocols implemented using raw sockets.

In some embodiments, there are two IPsec protocols: Encapsulating Security Payload (ESP) and Authentication Header (AH). Generally, AH and ESP protection are applied to traffic based on a five-tuple that includes protocol, source IP address specification, destination IP address specification, source port specification, and destination port specification. The five-tuple may be a higher-level construct than individual traffic patterns. For example, an IP address specification can include multiple (e.g., hundreds of) IP addresses. However, some embodiments of the security system 100 may associate IPsec security attributes with individual traffic patterns.

In some embodiments, the IPsec protocol requires that each packet sent or received by the TCP/IP stack 120 is protected in a manner that is described by a centralized security policy, where that description may be defined in terms of a five-tuple. An IPsec security policy database (not shown) may require that the packet described by the five-tuple be, for example, dropped, permitted without protection, or permitted with IPsec protection. If permitted with IPsec protection, the IPsec security policy database may be consulted to determine which security attributes are to be used to protect the traffic. Entries in the security database 160 may also be defined in terms of five-tuples. In some embodiments, each five-tuple in the security database 160 is equal to or a subset of a corresponding portion of the centralized security policy.

Generally, TCP 192 is a connection-oriented protocol that maintains a pairing, or connection, between two sockets. In some embodiments, the security system 100 may associate security attributes with TCP connections by associating TCP connections with control blocks that represent IPsec tunnels. Each IPsec tunnel contains a distinct set of IPsec security attributes. A binding between a TCP connection and an applicable IPsec tunnel may be made the first time IPsec protection is applied to an inbound or outbound packet over the connection. This binding may be updated, in some embodiments, only when the security attributes of the IPsec tunnel have changed. When this happens, the connection information maintained in the security database 160 may also be updated to reflect the change in IPsec protection for that connection.

Generally, UDP 194 is a connection-less protocol. For UDP 194, the security system 100 may maintain pseudo-connections based on well-defined traffic patterns. In some embodiments, these well-defined traffic patterns may be based on industry standards or user definitions. For example, and not by way of limitation, it is an industry standard for a Domain Name Server (DNS) to accept an incoming request on UDP port 53, and thus acceptance by a DNS of an incoming request on this port may establish a pseudo-connection for the purposes of the security system 100. In some embodiments, the security system 100 may maintain UDP pseudo-connections on a server/client basis, analogously to a TCP connection.

Determining a role (e.g., server or client) of an application 150 at the host 110 in a UDP pseudo-connection may be based on the directionality of a first datagram that flows across the applicable UDP socket. If the first datagram is inbound, then the application 150 is likely behaving as a server in the UDP pseudo-connection, and may be deemed as such. Otherwise, the application 150 may be considered a client. However, in some embodiments, the application's role may be determined based on configuration parameters specified by an administrator.

When a UDP pseudo-connection is identified, the security system 100 may determine and process security attributes in the same manner as, or a manner similar to, the determination and processing for TCP connections. Specifically, as with TCP 192, a binding between a UDP pseudo-connection and IPsec tunnel may be made the first time the IPsec tunnel is applied to an inbound or outbound packet, and this binding may be updated when the security attributes of the IPsec tunnel may have changed. When this happens, the pseudo-connection information maintained in security database 160 may also be updated to reflect the change in IPsec protection for that pseudo-connection.

In some embodiments, the security system 100 may additionally perform policy-based enforcement functions, which may be performed by the enforcement service 176 of the TCP/IP stack 120.

The security system 100 may allow network security administration to define the centralized security policy, which may include security attributes that are deemed acceptable for the applicable environment. Specifically, for instance, the centralized security policy may include a set of approved network security protocols that can be used. In some embodiments, the centralized security policy may indicate requirements of fine-grain attributes, such as a minimum version of the protocol, approved cryptographic cipher suites, or other specific requirements for security attributes. In some embodiments, the policy may additionally or alternatively require other attributes. For instance, the policy may identify custom rules for various traffic patterns based on combinations of transport protocols, local remote IP addresses or networks, and local or remote port ranges. Further, the policy may include a set of actions to take if network traffic does not meet the specified requirements of one or more approved network security protocols. For example, and not by way of limitation, such actions may include discarding traffic, logging an exception event, both, or other actions.

The enforcement service 176 may observe network traffic, regardless of transport protocol. The enforcement service 176 may further consult the centralized security policy and the security database 160 to determine whether observed traffic is permitted and to determine appropriate remedial actions in cases where the traffic violates the centralized security policy. Possible remedial actions include one or more of, but are not limited to: logging the violation, sending a notification to the appropriate personnel or event management systems, and terminating the connection, thereby stopping traffic over the connection. Thus, the security system 100 may perform real-time enforcement of network security requirements. Conventionally, because there is no central repository for the network security information for all network traffic on a host 110, there is also no conventional mechanism to specify or enforce a policy across all enabled network security protocol providers on that host 110. In contrast, the security system 100 may enable such enforcement.

The security database 160 may act as a central repository for the security system 100. Specifically, the security database 160 may maintain one or more security attributes for each connection, including pseudo-connections, detected by the security system 100. A security attribute may describe an aspect of security applicable to the corresponding connection. For example, and not by way of limitation, security attributes may indicate the type of security protocol used by the connection (e.g., none, TLS/SSL, SSH, or IPsec), a cipher suite in use, certificate credentials, or other information describing the network security of the connection.

In some embodiments, the aggregation service 174 may summarize usage of each secure session known to the TCP/IP stack 120 over a pre-defined interval of time, hereinafter referred to as an aggregation interval. For each secure session, the aggregation service 174 may record the security attributes associated with the secure session as well as utilization statistics for that session. Utilization statistics may include, but are not limited to the number of connections that were protected by each secure session during the aggregation interval, the amount of data (e.g., expressed in bytes, TCP segments, UDP datagrams, etc.) protected by each secure session during the aggregation interval, and, for each secure session, how many connections were protected only for part of their existence during the aggregation interval and how many were protected for their entire existence during the aggregation interval. In some embodiments, the aggregation service 174 may maintain statistics that span multiple aggregation intervals to provide a historical view of each secure session.

Security attributes and usage statistics may be aggregated from the perspective of a server's interaction with a given client. Aggregation may be performed for both local servers (i.e., where clients reside on remote hosts or on the local host 110) as well as remote servers (i.e., where a client resides on the local host 110). In some embodiments, server is generally identified by its IP address and TCP or UDP port, and a client is generally identified by its IP address without regard to its port. It is common for clients to use ephemeral client ports to connect to well-known server ports, and thus repeated connections from a single client may use a wide range of ephemeral ports over time. Classification of connections as belonging to a particular server may also be based on empirical information beyond just the IP address and ports in use. One example of empirical information overriding the general classification rule above is when a predefined range of local ephemeral ports is known to be used by a local server to provide services to its clients, such as is the case of passive File Transfer Protocol (FTP) data connections. In such cases, inbound connections to a port in the predefined range may be attributed to a common local server.

In general, the TCP/IP stack 120 may classify each TCP connection as a local server or local client connection based on the direction in which the connection was established. Inbound TCP connections (i.e., those in which the local host 110 is the target of the TCP connection) may be considered local server connections, while outbound TCP connections (i.e., those initiated by the local host 110) may be considered local client connections. Classification of a UDP pseudo-connection may be based on the direction of the first UDP datagram that flows over the pseudo-connection. If the first datagram is inbound (i.e., sent to the local host 110), then the pseudo-connection may be considered a local server. If the first datagram is outbound (i.e., sent by the local host 110), then the pseudo-connection may be considered to be a client. It will be understood that it is possible for the local host 110 to be both the client and server for the same connection. In such cases, secure session information and aggregated data may be maintained for both ends of the connection.

In some embodiments, classification of a connection as local server or local host 110 may also be based on empirical information beyond just the directionality of the TCP connection or initial UDP datagram. One example of empirical information overriding the general classification rule is when behavior of a local port is known to not conform to the directionality rules described above, such as is the case for FTP active data connections that use local port 20 for outbound connections to FTP clients. The aggregation service 174 may use the knowledge of such nonconforming cases to classify connections from that port as local server connections. The source of such empirical information may be based on convention (e.g., as in the case of FTP port 20) or on information that is configured into the local host 110.

For each local server, for some or all remote client connections to the local server, the security system 100 may aggregate information describing connections that are using a common secure session. Thus, a connection with a first secure session may be aggregated into a distinct record from a connection with a second secure session, even though both connections may relate to the same local server. Similarly, a single connection may be aggregated into two distinct records if associated with two distinct secure sessions. To achieve remote server views, the secure session information may be aggregated based on remote servers connected to by local clients and identified by the remote servers' TCP or UDP port and remote IP addresses, where the data may again be grouped based on like secure session.

In some embodiments, the aggregation occurs dynamically, such that each time the security database 160 is updated, the summary information for each secure session is responsively updated as well. In some embodiments, however, each set of security attributes may be initially added to the security database 160 in association with the corresponding connection, and aggregation may occur asynchronously with this addition, or may occur at a later time when large batches of saved connection records are aggregated.

Aggregating the security attributes as described herein may reduce the complexity of logging and storing those security attributes. For instance, in environments where workloads may generate thousands of connections per second, the amount of data generated for logging, reporting, and visualization can be overwhelming. Aggregation by the security system 100 may decrease the amount of data logged while maintaining the data related to security attributes. In some embodiments, aggregation provides a summarized view focused on security sessions, whereas records in the security database 160 are focused on connections. Thus, a visualization and report generation system may be built based on aggregated data, where the aggregation occurs as described herein. In some embodiments, the aggregated data may be loaded into tables of a relational database so that a visualization component can query the database in a wide variety of perspectives, ranging from a wide scope down to the server-client relationship.

The logging service 172 of the TCP/IP stack 120 may log events related to traffic at the host 110. In some embodiments, the security system 100 supports multiple levels of logging, such as connection-level logging and summary-level logging. By way of the connection-level logging, the logging service 172 may generate a log event each time a new network security session is established, renegotiated, or terminated on behalf of a specific application connection or UDP pseudo-connection. By way of the summary-level logging, the security system 100 may periodically log summarized information as maintained by the aggregation service 174. As a result of the logging, the security system 100 may be able to identify and report traffic that does not meet the centralized security policy. For example, and not by way of limitation, in some embodiments, the security system 100 may generate reports, such as real-time visualizations, of logged data to enable network administrators to determine compliance with the centralized security policy.

Figure 2:
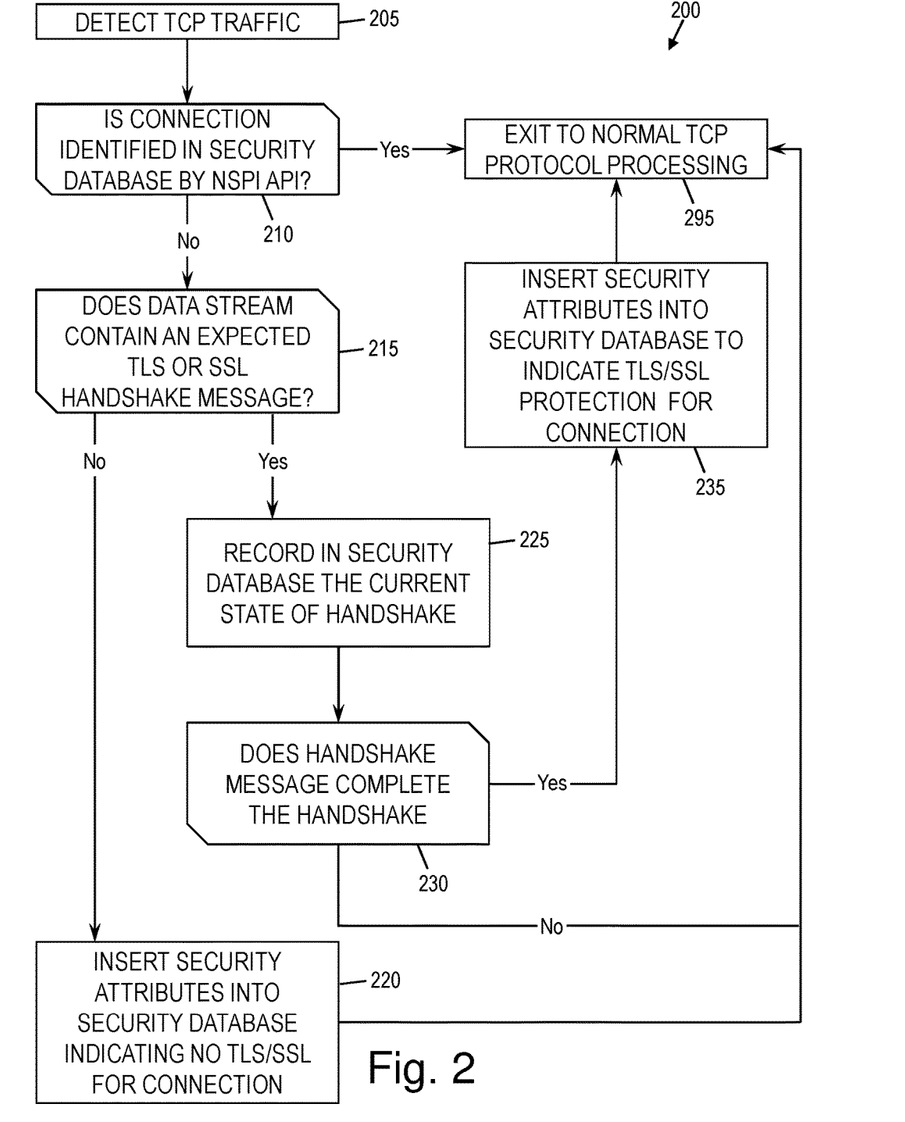
FIG. 2 is a flow diagram of a method for discovering and maintaining security attributes of IP network traffic, according to some embodiments of this invention.

FIG. 2 is a flow diagram of a method 200 for discovering and maintaining security attributes of IP network traffic at a host, according to some embodiments of this disclosure. Specifically, in some embodiments, the method 200 of FIG. 2 occurs at certain points in time when the state of the TCP data stream is well understood by the stream inspection service 178. A first of these points is when the first byte of application data flows over a TCP connection after the connection is successfully established. In some embodiments, a Handshake Notification API 182 may be in communication with one or more of the applications 150, as shown in FIG. 1. In that case, a second point in time is when an application 150 explicitly notifies the stream inspection service 178 through the Handshake Notification API 182 that a handshake to create a new secure session is about to occur. In the method 200 of FIG. 2, TLS and SSL are used as example security protocols. However, it will be understood that similar methods may be used for other security protocols, such as SSH, for TCP traffic.

As shown in FIG. 2, at block 205, a segment of inbound or outbound TCP traffic may be detected. At decision block 210, it may be determined whether the applicable connection is already identified by the network security protocol informational API 185 in the security database 160. If the connection is already identified by the network security protocol informational API 185, then at block 295, the security system 100 may exit to normal TCP protocol processing.

If the connection is not yet identified by the network security protocol informational API 185 in the security database 160, then at decision block 215, it may be determined whether the stream contains an expected TLS or SSL handshake message. A handshake message can be "expected," in the sense that it is required by a security protocol and thus expected to take place before a security protocol is in place. If no expected handshake message is identified, then at block 220 the security system 100 may insert into the security database 160 security attributes for the connection, based on stream inspection, indicating that no security is in use. The method 200 may then proceed to block 295, where the security system 100 may exit to normal TCP protocol processing. However, if an expected handshake message is identified at decision block 215, then at block 225 a current state of the handshake may be recorded in the security database 160 based on the handshake message observed in the stream.

At decision block 230, it may be determined whether the handshake message completed the handshake. If the handshake was completed, then at block 235 the security system 100 may insert security attributes for this connection into the security database 160 based on stream inspection. The method 200 may then exit to normal TCP processing at block 295. However, if the handshake message did not complete the handshake, then the method 200 may simply exit to normal TCP processing at block 295.

After performing block 295, the method 200 may await another piece of stream data for consideration.

Figure 3:
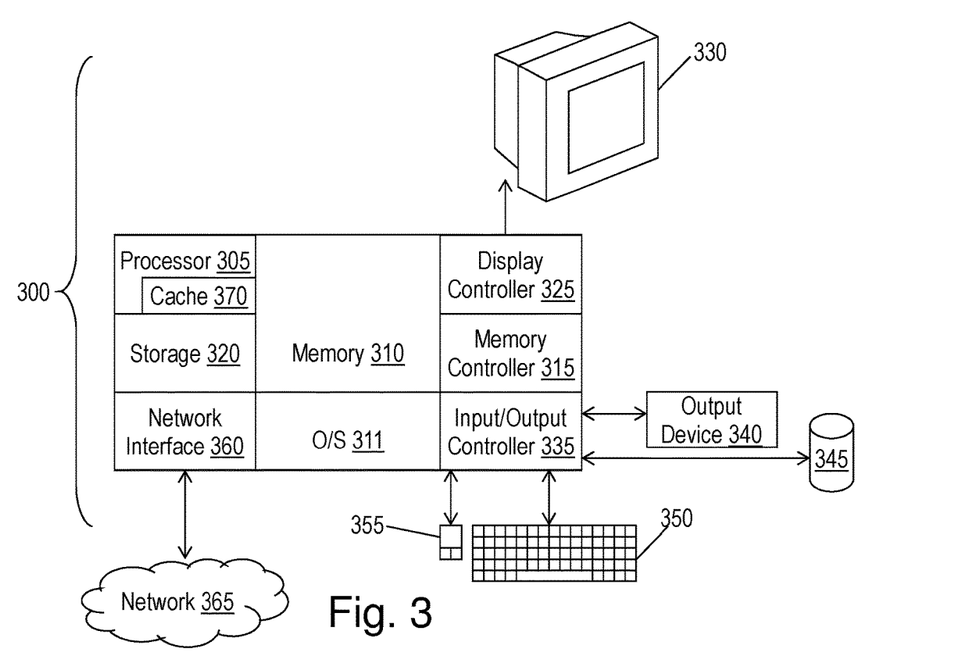
FIG. 3 is a block diagram of a computer system for implementing some or all aspects of the security system, according to some embodiments of this invention.

FIG. 3 illustrates a block diagram of a computer system 300 for use in implementing a security system 100 or method according to some embodiments. The security systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For instance, the host 110 described above as incorporating the security system 100 may be a computer system 300.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the security systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Security systems 100 and methods according to this disclosure may be embodied, in whole or in part, in computer program products or in computer systems 300, such as that illustrated in FIG. 3.

Technical effects and benefits of some embodiments include enabling the TCP/IP stack 120 of a host 110 to observe and store security attributes of TCP traffic, UDP traffic, and IPsec traffic. With these security attributes, the security system 100 can determine whether a centralized security policy is being complied with and can enforce the centralized security policy as needed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   monitoring a plurality of connections of a plurality of host applications at a host, wherein a first connection of the plurality of connections carries network traffic associated with a first host application running at the host, and wherein a second connection of the plurality of connections carries network traffic associated with a second host application running at the host;
   detecting a plurality of sets of security attributes, comprising a a first set of security attributes of the first connection of the first host application running at the host and a second set of security attributes of the second connection of the second host application running at the host;
   storing the plurality of sets of security attributes in a security database;
   comparing, from the security database, the first set of security attributes of the first connection to a centralized security policy;
   determining that the first set of security attributes of the first connection fails to meet one or more requirements of the centralized security policy;
   comparing, from the security database, the second set of security attributes of the second connection to the centralized security policy;
   determining that the second set of security attributes of the second connection meet the one or more requirements of the centralized security policy; and
   performing a remedial action related to the first connection of the first host application while allowing network traffic to continue over the second connection of the second host application, responsive to the first set of security attributes of the first connection of the first host application failing to meet the one or more requirements of the centralized security policy while the second set of security attributes of the second connection of the second host application meets the one or more requirements of the centralized security policy;
   wherein a selection of which connections to remediate from among the plurality of connections is based on which connections are associated with respective security attributes that fail to meet the one or more requirements of the centralized security policy.

2. The computer-implemented method of claim 1, wherein the detecting the plurality of sets of security attributes comprises detecting when a security handshake will occur over the first connection, and wherein the detecting when the security handshake will occur over the first connection comprises receiving a signal from an application programming interface in communication with a first host application associated with the first connection.

3. The computer-implemented method of claim 1, wherein the detecting the plurality of sets of security attributes comprises:
   implementing a network security protocol informational Application Programming Interface (API) in a Transmission Control Protocol/Internet Protocol (TCP/IP) stack for the host; and
   receiving, at the network security protocol informational API, one or more security attributes from a security protocol provider outside the TCP/IP stack.

4. The computer-implemented method of claim 1, wherein the plurality of connections comprise one or more User Datagram Protocol (UDP) pseudo-connections, and further comprising:
   identifying a UDP pseudo-connection, wherein the identifying the UDP pseudo-connection comprises detecting a traffic pattern defined by at least one of an industry standard and a user definition; and
   determining a role of a host application in the UDP pseudo-connection, wherein the determining the role is based on at least one of a directionality of a first datagram across the UDP pseudo-connection and one or more configuration parameters.

5. The computer-implemented method of claim 1, further comprising:
   summarizing information about the plurality of connections existing during an aggregation interval; and
   determining, based on the summarizing, which of the plurality of connections were protected by security throughout a respective term of the connection existing during the aggregation interval and which of the plurality of connections were protected by security throughout a portion less than the respective term of the connection existing during the aggregation interval.

6. The computer-implemented method of claim 1, further comprising:
   classifying each host application, of the plurality of host applications, as behaving as one of a local client and a local server; and
   aggregating information about the plurality of connections associated with the plurality of host applications, based on classification of each host application as at least one of a local client and a local server.

7. The computer-implemented method of claim 6, wherein the classifying each host application as one of a local client and a local server is based on, for each host application, at least one of a direction in which a connection of the host application was established and a set of ports used for the connection.

8. The computer-implemented method of claim 1, wherein the performing the remedial action on the first connection comprises stopping the network traffic over the first connection.

9. A system comprising:
   a memory having computer-readable instructions; and
   one or more processors for executing the computer-readable instructions, the computer-readable instructions comprising:
      monitoring a plurality of connections of a plurality of host applications at a host, wherein a first connection of the plurality of connections carries network traffic associated with a first host application running at the host, and wherein a second connection of the plurality of connections carries network traffic associated with a second host application running at the host;

detecting a plurality of sets of security attributes, comprising a a first set of security attributes of the first connection of the first host application running at the host and a second set of security attributes of the second connection of the second host application running at the host;

storing the plurality of sets of security attributes in a security database;

comparing, from the security database, the first set of security attributes of the first connection to a centralized security policy;

determining that the first set of security attributes of the first connection fails to meet one or more requirements of the centralized security policy;

comparing, from the security database, the second set of security attributes of the second connection to the centralized security policy;

determining that the second set of security attributes of the second connection meet the one or more requirements of the centralized security policy; and performing a remedial action related to the first connection of the first host application while allowing network traffic to continue over the second connection of the second host application, responsive to the first set of security attributes of the first connection of the first host application failing to meet the one or more requirements of the centralized security policy while the second set of security attributes of the second connection of the second host application meets the one or more requirements of the centralized security policy;

wherein a selection of which connections to remediate from among the plurality of connections is based on which connections are associated with respective security attributes that fail to meet the one or more requirements of the centralized security policy.

10. The system of claim 9, wherein the detecting the plurality of sets of security attributes comprises detecting when a security handshake will occur over the first connection, and wherein the detecting when the security handshake will occur over the first connection comprises receiving a signal from an application programming interface in communication with a first host application associated with the first connection.

11. The system of claim 9, wherein the detecting the plurality of sets of security attributes comprises:

implementing a network security protocol informational Application Programming Interface (API) in a Transmission Control Protocol/Internet Protocol (TCP/IP) stack for the host; and receiving, at the network security protocol informational API, one or more security attributes from a security protocol provider outside the TCP/IP stack.

12. The system of claim 9, wherein the plurality of connections comprise one or more User Datagram Protocol (UDP) pseudo-connections, and the computer-readable instructions further comprising:

identifying a UDP pseudo-connection, wherein the identifying the UDP pseudo-connection comprises detecting a traffic pattern defined by at least one of an industry standard and a user definition; and determining a role of a host application in the UDP pseudo-connection, wherein the determining the role is based on at least one of a directionality of a first datagram across the UDP pseudo-connection and one or more configuration parameters.

13. The system of claim 9, the computer-readable instructions further comprising:

summarizing information about the plurality of connections existing during an aggregation interval; and determining, based on the summarizing, which of the plurality of connections were protected by security throughout a respective term of the connection existing during the aggregation interval and which of the plurality of connections were protected by security throughout a portion less than the respective term of the connection existing during the aggregation interval.

14. The system of claim 9, the computer-readable instructions further comprising:

classifying each host application, of the plurality of host applications, as behaving as one of a local client and a local server; and aggregating information about the plurality of connections associated with the plurality of host applications, based on classification of each host application as at least one of a local client and a local server.

15. The system of claim 14, wherein the classifying each host application as one of a local client and a local server is based on, for each host application, at least one of a direction in which a connection of the host application was established and a set of ports used for the connection.

16. The system of claim 9, wherein the performing the remedial action on the first connection comprises stopping the network traffic over the first connection.

17. A computer-program product for enforcing a centralized, cryptographic network policy, the computer-program product comprising a non-transitory computer-readable storage medium having program instructions embodied therewith, the program instructions executable by a processor to cause the processor to perform a method comprising:

monitoring a plurality of connections of a plurality of host applications at a host, wherein a first connection of the plurality of connections carries network traffic associated with a first host application running at the host, and wherein a second connection of the plurality of connections carries network traffic associated with a second host application running at the host;

detecting a plurality of sets of security attributes, comprising a a first set of security attributes of the first connection of the first host application running at the host and a second set of security attributes of the second connection of the second host application running at the host;

storing the plurality of sets of security attributes in a security database;

comparing, from the security database, the first set of security attributes of the first connection to a centralized security policy;

determining that the first set of security attributes of the first connection fails to meet one or more requirements of the centralized security policy;

comparing, from the security database, the second set of security attributes of the second connection to the centralized security policy;

determining that the second set of security attributes of the second connection meet the one or more requirements of the centralized security policy; and performing a remedial action related to the first connection of the first host application while allowing network traffic to continue over the second connection of the second host application, responsive to the first set of security attributes of the first connection of the first host application failing to meet the one or more requirements of the centralized security policy while the second set of security attributes of the second connection of the second host application meets the one or more requirements of the centralized security policy;

wherein a selection of which connections to remediate from among the plurality of connections is based on which connections are associated with respective security attributes that fail to meet the one or more requirements of the centralized security policy.

18. The computer-program product of claim 17, wherein the plurality of connections comprise one or more User Datagram Protocol (UDP) pseudo-connections, and the method further comprising:

identifying a UDP pseudo-connection, wherein the identifying the UDP pseudo-connection comprises detecting a traffic pattern defined by at least one of an industry standard and a user definition; and determining a role of a host application in the UDP pseudo-connection, wherein the determining the role is based on at least one of a directionality of a first datagram across the UDP pseudo-connection and one or more configuration parameters.

19. The computer-program product of claim 17, the method further comprising:

summarizing information about the plurality of connections existing during an aggregation interval; and determining, based on the summarizing, which of the plurality of connections were protected by security throughout a respective term of the connection existing during the aggregation interval and which of the plurality of connections were protected by security throughout a portion less than the respective term of the connection existing during the aggregation interval.

20. The computer-program product of claim 17, the method further comprising:

classifying each host application, of the plurality of host applications, as behaving as one of a local client and a local server; and aggregating information about the plurality of connections associated with the plurality of host applications, based on classification of each host application as at least one of a local client and a local server.

* * * * *